US012803204B2

(12) United States Patent
Messuri et al.

(10) Patent No.: US 12,803,204 B2

(45) Date of Patent: Nov. 17, 2026

(54) ELECTRICAL CONNECTOR WITH INNER TERMINAL CARTRIDGE FOR PAIRED WIRE CABLES

(71) Applicant: Aptiv Technologies AG, Schaffhausen (CH)

(72) Inventors: Michael D. Messuri, Canfield, OH (US); Nicole L. Liptak, Cortland, OH (US); Ryan D. Lewis, Niles, OH (US); Jared Bilas, North Bloomfield, OH (US); Luke A. Bucey, McDonald, OH (US)

(73) Assignee: Aptiv Technologies AG, Schaffhausen (CH)

( * ) Notice: Subject to any disclaimer, the term of this patent is extended or adjusted under 35 U.S.C. 154(b) by 356 days.

(21) Appl. No.: 18/439,085

(22) Filed: Feb. 12, 2024

(65) Prior Publication Data

US 2024/0275096 A1 Aug. 15, 2024

Related U.S. Application Data

(60) Provisional application No. 63/445,091, filed on Feb. 13, 2023.

(51) Int. Cl.

| | |
|---|---|
| ***H01R 13/04*** | (2006.01) |
| ***H01R 13/629*** | (2006.01) |
| ***H01R 13/639*** | (2006.01) |
| ***H01R 43/20*** | (2006.01) |
| ***H01R 103/00*** | (2006.01) |

(52) U.S. Cl.

CPC ........... *H01R 13/04* (2013.01); *H01R 13/629* (2013.01); *H01R 13/639* (2013.01); *H01R 43/20* (2013.01); *H01R 2103/00* (2013.01)

(58) Field of Classification Search

CPC .... H01R 13/04; H01R 13/629; H01R 13/639; H01R 43/20; H01R 2103/00

USPC ...................................................... 439/733.1

See application file for complete search history.

(56) References Cited

U.S. PATENT DOCUMENTS

| | | | |
|---|---|---|---|
| 11,362,466 B2 | 6/2022 | Droesbeke et al. | |
| 11,411,352 B2 | 8/2022 | Droesbeke et al. | |
| 11,637,405 B2 | 4/2023 | Droesbeke et al. | |
| 11,664,629 B2 | 5/2023 | Droesbeke | |
| 2021/0057855 A1* | 2/2021 | Droesbeke ......... | H01R 13/6593 |

(Continued)

FOREIGN PATENT DOCUMENTS

| | | |
|---|---|---|
| BE | 1028299 A1 | 12/2021 |
| EP | 3783756 A1 | 2/2021 |

OTHER PUBLICATIONS

"Extended European Search Report Received for Application No. 24157252.8 mailed on Jun. 20, 2024", 9 Pages.

(Continued)

*Primary Examiner* — Gary F Paumen

(74) *Attorney, Agent, or Firm* — Billion & Armitage

(57) ABSTRACT

Electrical connectors that support coupling of paired wire cables is described. The electrical connector includes an inner terminal cartridge and an insulator body. The inner terminal cartridge includes a pair of terminal cavities configured to retain a pair of inner terminals at elongate sides of the inner terminal cartridge. The inner terminal cartridge is insertable into the insulator body to simultaneously stage the inner terminals in a mating position in the insulator body.

17 Claims, 6 Drawing Sheets

(56) References Cited

U.S. PATENT DOCUMENTS

| | | | | |
|---|---|---|---|---|
| 2022/0207498 | A1 | 6/2022 | Kim | |
| 2023/0144535 | A1 * | 5/2023 | Stamm | H01R 13/6476 439/695 |
| 2023/0335956 | A1 * | 10/2023 | Droesbeke | H01R 43/0221 |

OTHER PUBLICATIONS

U.S. Appl. No. 18/394,028, filed Dec. 22, 2023; Titled: Connector Assembly.

* cited by examiner

ELECTRICAL CONNECTOR WITH INNER TERMINAL CARTRIDGE FOR PAIRED WIRE CABLES

CROSS-REFERENCE TO RELATED APPLICATIONS

This application claims the benefit of and priority to U.S. provisional application 63/445,091, titled "ELECTRICAL CONNECTOR WITH INNER TERMINAL CARTRIDGE FOR PAIRED WIRE CABLES", filed Feb. 13, 2023, the entire contents of which are incorporated by reference herein.

TECHNICAL FIELD

This disclosure is directed to electrical connectors, and more specifically, electrical connectors that support coupling of paired wire cables.

BACKGROUND

Existing electrical connectors for differential pair applications used in some high-frequency applications require a blind axial plug for inner terminal insertion to an insulator. Installation of the individual terminals increases risks of misalignment to insulator cavity, resulting in stubbing issues and damage to the contact region of the terminal. Individual terminal plugging may also increase terminal to terminal offset due to variation in plugging depth, which results in skew between terminal pairs and degraded signal integrity. Traditional miniaturized high-frequency connector designs may utilize ineffective forward stops, resulting in uncontrolled terminal position (terminal push-through) and variations in the terminal interface.

SUMMARY

This disclosure is directed to improvements in electrical connectors that support coupling of paired wire cable that support differential signaling.

According to one example, an electrical connector is described. The electrical connector includes an insulator body. The electrical connector further includes an inner terminal cartridge with a pair of terminal cavities that retain a pair of inner terminals of a paired wire cable at elongate sides of the inner terminal cartridge. The terminal cartridge is configured to be seated in the insulator body with the pair of inner terminals retained in the pair of terminal cavities, and inserted into the insulator body to simultaneously stage the pair of inner terminals in a mating position in lateral alignment in the insulator body.

According to another example, a method is described. The method includes arranging a pair of inner terminals that terminate respective terminated leads of a paired wire cable in a pair of terminal cavities at elongate sides of an inner terminal cartridge. The method further includes seating the inner terminal cartridge, with the pair of inner terminals arranged in the pair of terminal cavities, in an insulator body. The method further includes inserting the inner terminal cartridge into insulator body to simultaneously stage the pair of inner terminals in a mating position in the insulator body.

According to another example, an electrical connector is described. The electrical connector includes a pair of terminated leads carried within an external jacket and terminated by a pair of inner terminals. The electrical connector further includes an insulator body and an outer shield that retains the insulator body. The electrical connector further includes an inner terminal cartridge with a pair of terminal cavities that retain the pair of inner terminals at elongate sides of the inner terminal cartridge. The inner terminal cartridge is configured to be seated in the insulator body with the pair of inner terminals retained in the pair of terminal cavities, and inserted into the insulator body to simultaneously stage the pair of inner terminals in a mating position in lateral alignment in the insulator body.

BRIEF DESCRIPTION OF THE DRAWINGS

The present invention will now be described by way of example with reference to the accompanying drawings, in which.

DETAILED DESCRIPTION

Figure 1:
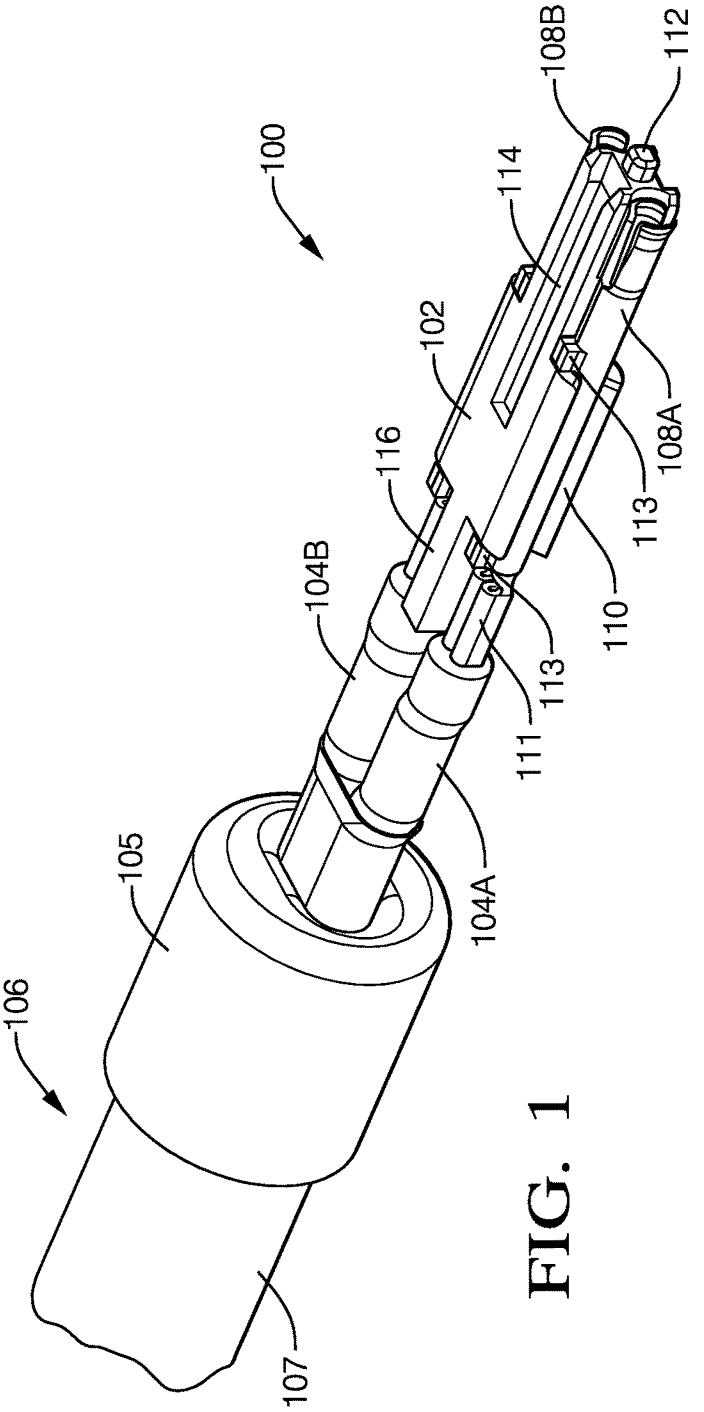
FIG. 1 illustrates an isometric view of an electrical connector with an inner terminal cartridge for paired wire cables according to some embodiments.

A non-limiting example of an electrical connector 100 for paired wire cables with an inner terminal cartridge is described and depicted in FIGS. 1-12. FIG. 1 depicts an isometric view of a paired wire cable 106 that includes a pair of independently jacketed terminated leads 104A, 104B that are both carried within an external jacket 107 and extend through an end cap 105. The terminated leads 104A, 104B are differential cables that carry electrical signals with complementary voltages. The terminated leads 104A, 104B are each terminated in respective inner terminals 108A, 108B coupled to the terminated leads 104A, 104B by a crimp 111.

Figure 2:
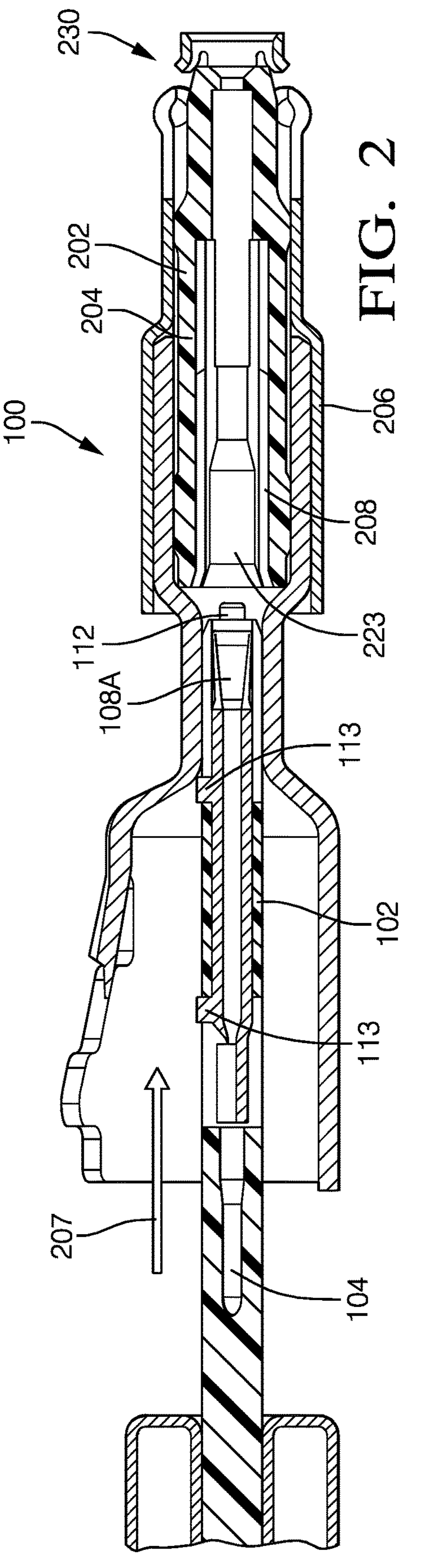
FIG. 2 illustrates a cross section side view of an electrical connector according to some embodiments.

As shown in FIG. 1, connector 100 further includes inner terminal cartridge 102 that is formed of an electrically insulative material and allows for retention of each inner terminal 108A, 108B of terminated leads 104A, 104B of the differential pair cable 106 prior to insertion into an insulator body 202, which may also be formed of an electrically insulative material. FIG. 2 shows an example connector 100 including an insulator body 202 secured within an outer shield terminal 206. Outer shield terminal 206 is configured to be coupled at a mating end 230 to a corresponding outer terminal (not shown) to facilitate electrical connection to terminated leads 104A, 104B. As indicated by the direction of arrow 207 shown in FIG. 2, inner terminal cartridge 102 may be inserted into the insulator body 202, which simultaneously stages both of the paired inner terminals 108A, 108B in a mating position (i.e., prepared to be mated with by a corresponding terminal (not shown) when secured in the insulator body 202. In the mating position, the inner terminal cartridge 102 are aligned laterally, for example relative to the insulator body 202 in an insertion direction 207 of the inner terminal cartridge 102 into the insulator body. In the mating the position, the paired inner terminals 108A, 108B may also be laterally aligned in the insertion direction 207 relative to one another, meaning that each of paired inner terminals 108A, 108B are both staged at the same lateral position for mating when secured in the insulator body 202.

Figure 3:
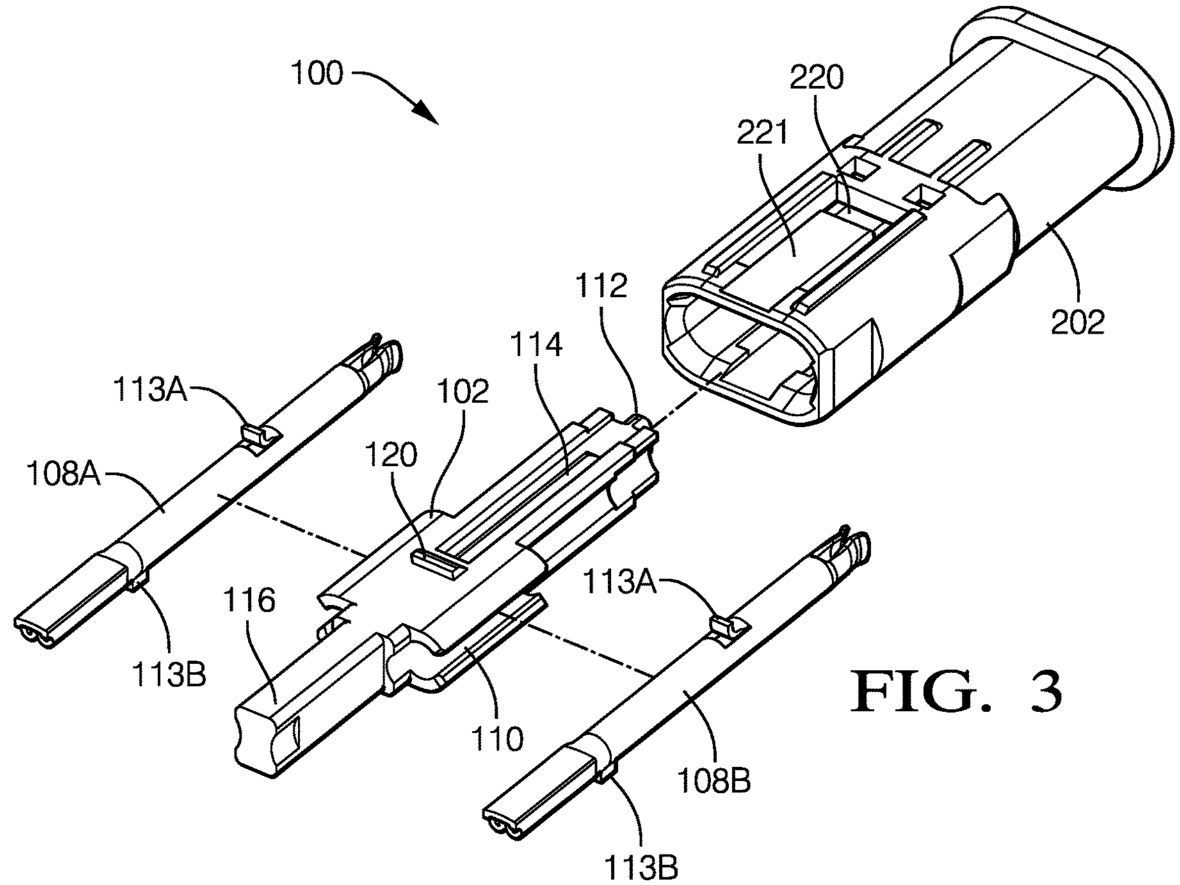
FIG. 3 illustrates a top exploded view of an electrical connector including an inner terminal cartridge and terminals of a paired wire cable according to some embodiments.
Figure 4:
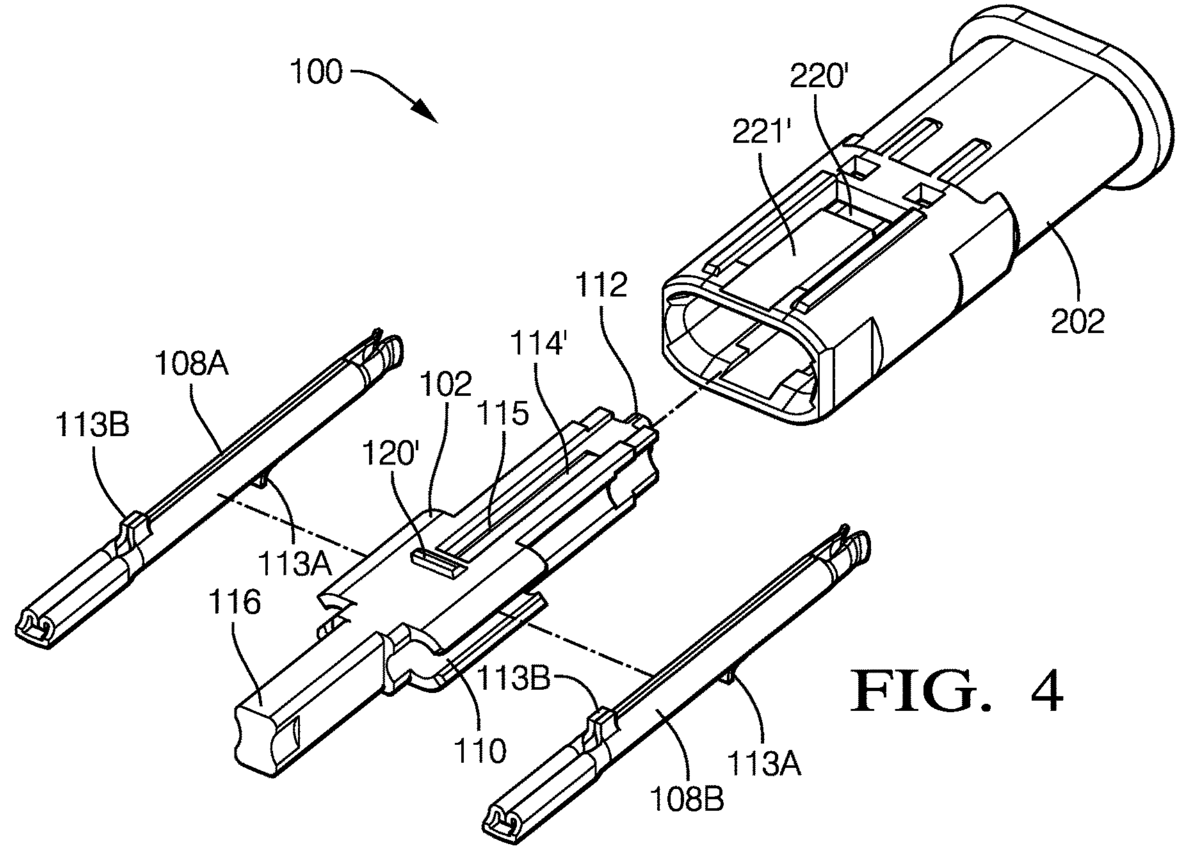
FIG. 4 illustrates a bottom exploded view of the electrical connector of FIG. 3 according to some embodiments.
Figure 5:
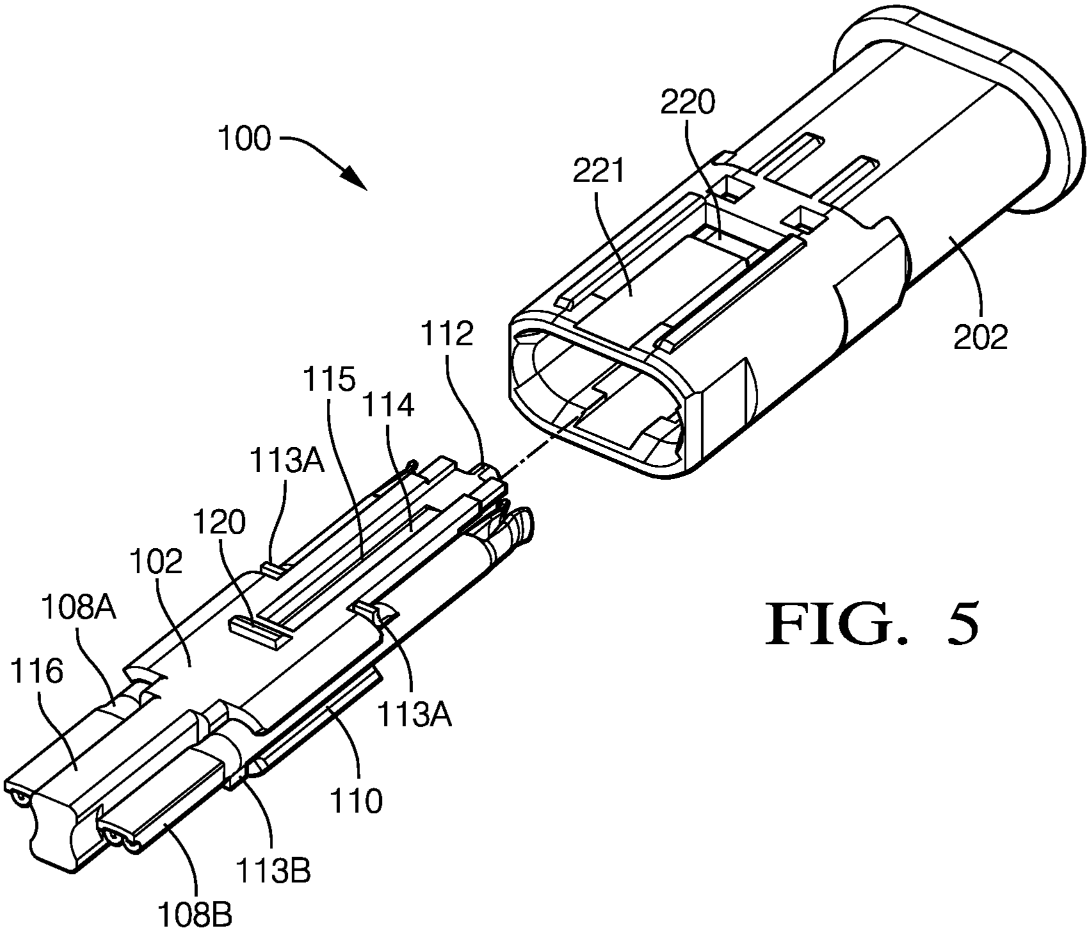
FIG. 5 illustrates an exploded view of the electrical connector of FIG. 3, with terminals retained by the inner terminal cartridge according to some embodiments.
Figure 6:
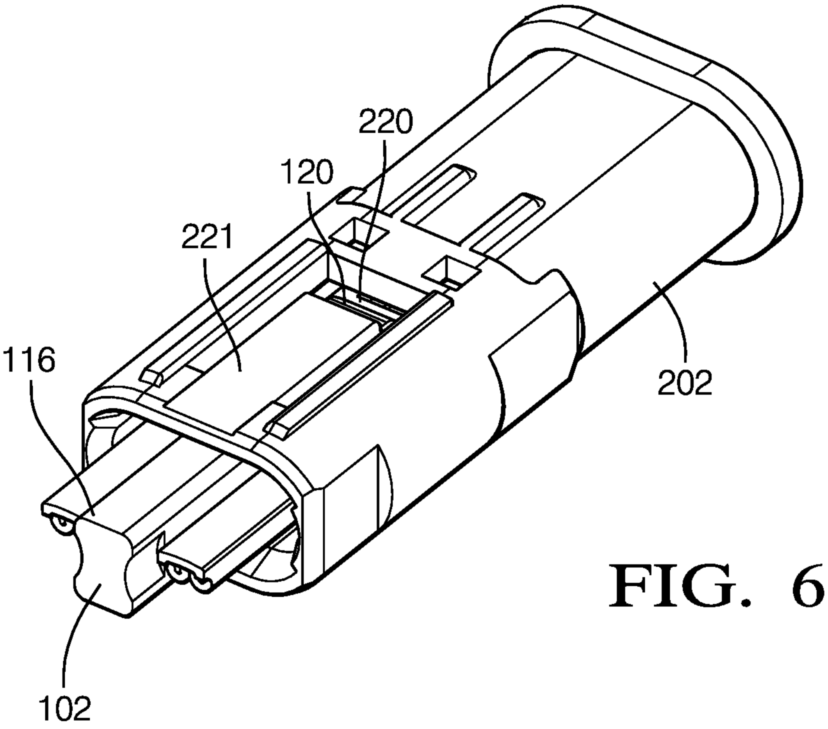
FIG. 6 illustrates an isometric view of the electrical connector of FIG. 3 with the inner terminal cartridge staged in the insulator body according to some embodiments.

FIG. 3 depicts a top exploded view showing separate components of electrical connector 100. FIG. 4 depicts bottom exploded view of the opposed side of the separate components shown in FIG. 3. In FIG. 4, reference numerals with a prime (') symbol indicate a feature presented on the top side of a respective component of electrical connector 100 in FIG. 3 that is similarly presented on the opposed side of the component in FIG. 4. FIG. 5 depicts an exploded view of electrical connector 100, with inner terminals 108A, 108B, retained by inner terminal cartridge 102, before the inner terminal cartridge 102 is inserted into the insulator body 202. FIG. 6 is diagram showing connector 100 with inner terminal cartridge 102 staged in insulator body 202.

Figure 7:
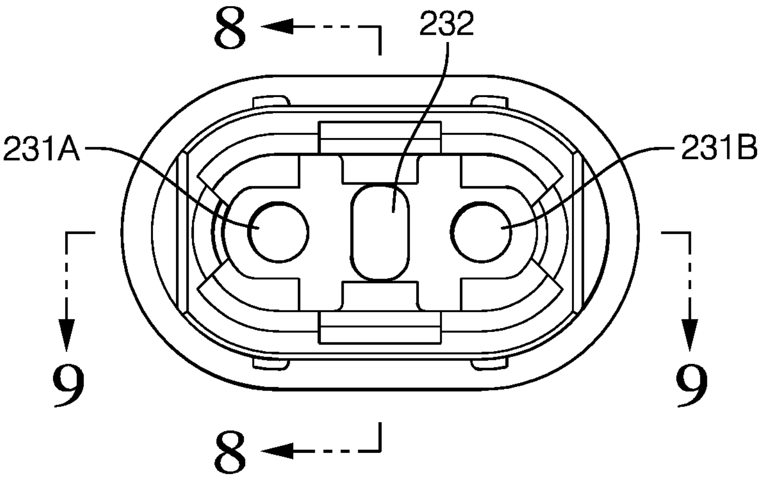
FIG. 7 illustrates an end view of an insulator body according to some embodiments.
Figure 8:
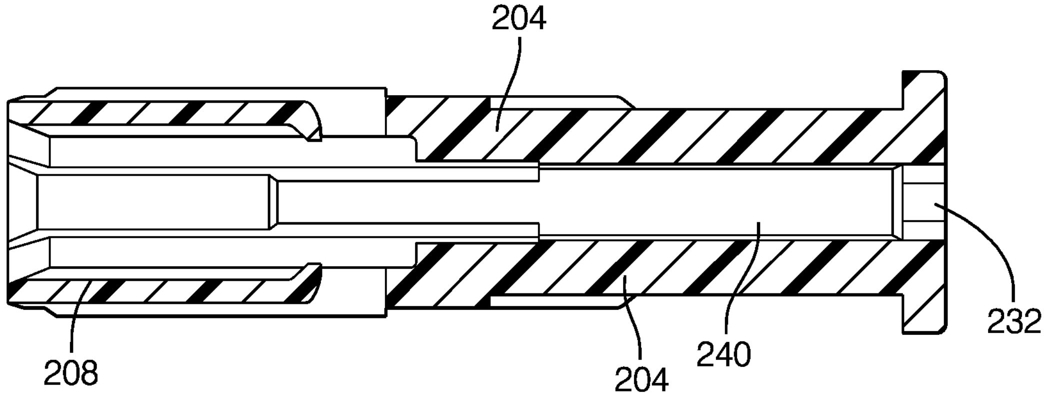
FIG. 8 illustrates a cross sectional view of an insulator body taken along line 8-8 in FIG. 7 according to some embodiments.
Figure 9:
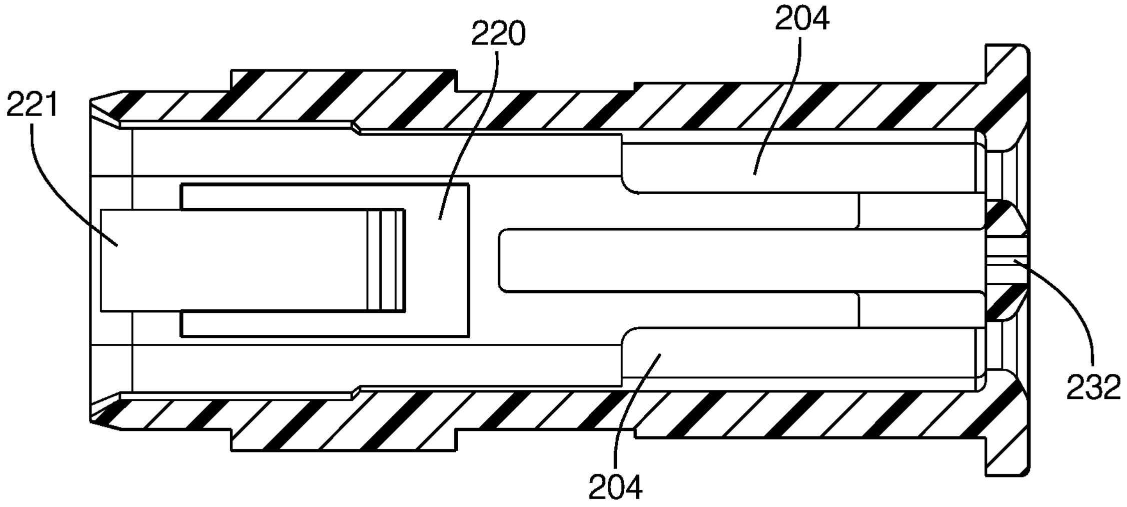
FIG. 9 illustrates a cross sectional view of an insulator body taken along line 9-9 in FIG. 7 according to some embodiments.
Figure 10:
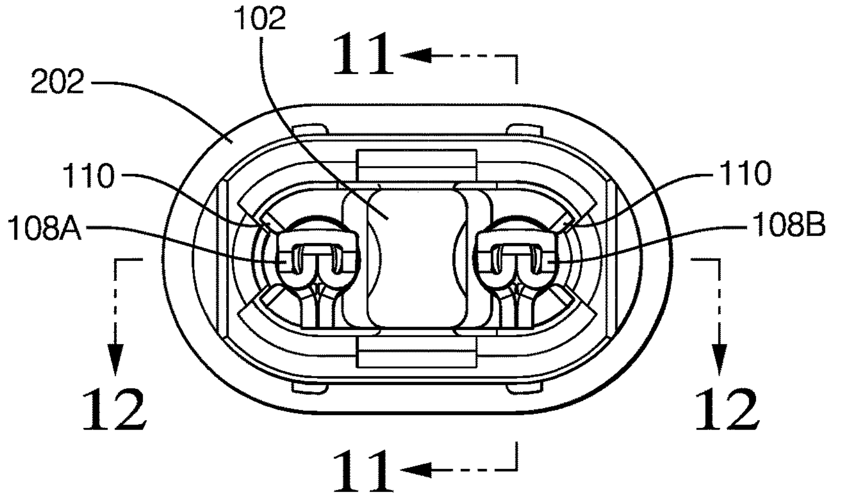
FIG. 10 illustrates an end view of an insulator body with an inner terminal cartridge staged in the insulator body according to some embodiments.
Figure 11:
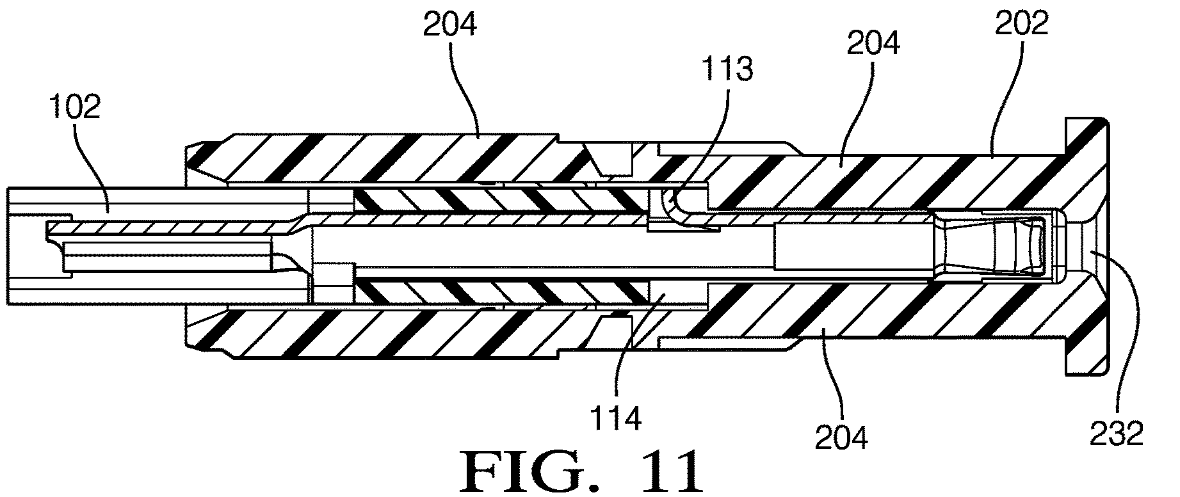
FIG. 11 illustrates a cross sectional view of an insulator body, an inner terminal cartridge staged in the insulator body taken along line 11-11 shown in FIG. 10 according to some embodiments.
Figure 12:
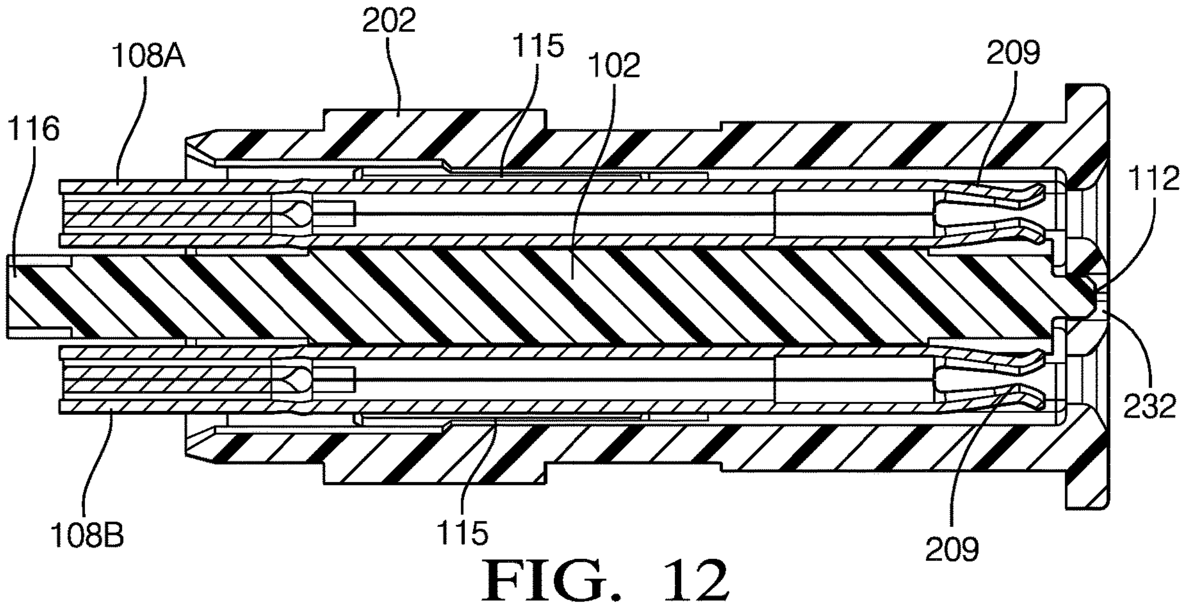
FIG. 12 illustrates a cross sectional view of an insulator body, an inner terminal cartridge staged in the insulator body taken along line 12-12 shown in FIG. 10 according to some embodiments.

FIG. 7 depicts an end view of an empty insulator body 202, before inner terminal cartridge 102 is inserted in the insulator body 202 as shown in the examples of FIGS. 3 and 4. FIG. 8 is a cross section view of the empty insulator body 202 along the section lines 8-8 depicted in FIG. 7. FIG. 9 is a cross section view of the empty insulator body 202 along the section lines 9-9 depicted in FIG. 7. FIG. 10 depicts a side view of insulator body 202 with inner terminal cartridge 102 staged in the insulator body 202 as shown in FIG. 5. FIG. 11 is a cross section view of the inner terminal cartridge 102 staged in the insulator body 202 along the section lines 11-11 depicted in FIG. 10. FIG. 12 is a cross section view of the inner terminal cartridge 102 staged in the insulator body 202 along the section lines 12-12 depicted in FIG. 10.

Inner terminal cartridge 102 has an elongate shape, and is configured to fit within insulator body 202. Inner terminal cartridge 102 has a pair of terminal cavities 110 configured to retain the inner terminals 108A, 108B. In the depicted, the terminal cavities 110 are arranged along the elongate sides of the inner terminal cartridge 102. The terminal cavities 110 are “C” shaped, with an internal diameter that corresponds to a diameter of inner terminals 108A, 108B. In the depicted example, terminal cavities 110 are configured to be side loaded by the paired inner terminals 108A, 108B. For example, pressing one of inner terminals 108A, 108B into the “C” shape terminal cavities 110 may cause the terminal cavity 110 to deflect and allow the inner terminals 108A, 108B to snap into the terminal cavity 110 and be retained. In other examples not depicted, the terminal cavities 110 are arranged on other surfaces of the inner terminal cartridge 102 than the side surfaces as depicted, for example on top or bottom surfaces of the inner terminal cartridge 102. In some examples, the terminal cavities 110 are configured to be top or bottom loaded instead of side loaded as in the FIG. 1. In other examples, the terminal cavities 110 are configured to be axially loaded from behind. In some examples, the terminal cavities 110 have a “C” shape as depicted. In other examples, the terminal cavities are instead enclosed or substantially enclosed channels in an “O” shape instead of the depicted “C” shaped terminal cavities 110, for example if the terminal cavities 110 are configured to be axially loaded.

As shown in FIGS. 3-5, inner terminals 108A, 108B each include at least one protrusion 113A, 113B configured to interact with terminal cavities 110 to align inner terminals 108A, 108B laterally as shown in FIG. 5. When laterally aligned as shown in FIG. 5, inner terminals 108A, 108B are arranged to be simultaneously mated when inner terminal cartridge 102 is inserted in the insulator body 202, as shown in FIG. 6. As shown in FIGS. 3-5, each of inner terminals 108A, 108B may include two protrusions 113A, 113B, each arranged to interface with a respective side of the respective terminal cavity 110. Each of the protrusions 113A, 113B may be described as tabs, bumps or other structure that include a surface to engage with the terminal cartridge 102 (e.g., respective sides of the terminal cavities 110) to retain the inner terminals 108A, 108B in the terminal cartridge 102. In some examples, the protrusions 113A, 113B are similarly constructed, in other examples they may be formed differently. For example, referring to FIG. 3A, protrusions 113B are formed by bringing corresponding tabs formed by folding respective ends of a metallic substrate together to form inner terminals 108A, 108B. In some examples, referring to FIG. 3B protrusions 113B are annularly shaped tabs that are welded, soldered, deposited on, or otherwise formed on the inner terminals 108A, 108B. In other examples, inner terminals 108A, 108B may include more or fewer protrusions 113A, 113B. In the example of FIGS. 3 and 4, protrusions 113A, 113B are arranged on opposed sides (e.g., top and bottom sides) of inner terminals 108A, 108B, which may in some examples be different protrusions 113A and 113B. In other examples such as shown in FIGS. 1 and 2, protrusions 113 can be substantially identical and arranged differently, for example on the same side of inner terminals 108A, 108B, with the terminal cavity 110 arranged between the protrusions 113.

As shown in FIG. 3, inner terminal cartridge 102 further includes an indicator peg 112 located near the front of inner terminal cartridge 102. Indicator peg 112 is arranged to extend through an indicator slot 232 in the insulator body 202, as shown in FIG. 7, when inner terminal cartridge 102 is properly staged in insulator body 202, allowing a visual presence check and verification of proper positioning of inner terminal cartridge 102 and the inner terminals 108 during assembly of the inner terminal cartridge 102 into the insulator body 202. In some examples, the indicator slot 232 may be arranged between terminal apertures 231A, 231B formed in the insulator body 202, which are configured to receive a corresponding pair of mating terminals for mating when inner terminals 108A, 108B are staged in insulator body 202.

Connector 100 further includes alignment features to ensure alignment of the inner terminal cartridge 102 throughout installation until the inner terminal cartridge 102 is finally staged in insulator body 202. In the example illustrated in FIG. 3 the alignment features are in the form of rails 204 within the insulator body 202 and slots 114 defined in the inner terminal cartridge 102. In some examples, the alignment features include one or more crush surfaces (e.g, crush surfaces 208 defined in the insulator body 202 as depicted in FIG. 2, or crush surfaces 115 defined in slots 114 of the inner terminal cartridge 102) configured to be crushed in response to inserting the inner terminal cartridge 102 in the insulator body 202. Other alternate embodiments may be envisioned having different alignment features, e.g., the insulator body defining slots and the inner terminal cartridge defining rails or other known alignment features defined in the insulator body 202 and inner terminal cartridge 102.

Inner terminal cartridge 102 further includes an insulator spacer feature 116 shown in FIG. 3 that controls a distance between the inner terminals 108A, 108B in the critical transition area (e.g., crimp 111) from the inner terminals 108A, 108B to the differential pair cable 106 to maintain consistent spacing and thereby consistent electrical impedance of the differential pair cable 106. The insulator spacer feature 116 can also be adjusted to provide rigidity to the terminated leads 104A, 104B during plugging to prevent cable buckling.

Connector 100 may further include locking features that secure inner terminal cartridge 102 in a staged position in insulator body 202, which inner terminals 108A, 108B are staged in a mating position. For example, referring to FIG. 3, inner terminal cartridge 102 includes a ramped feature 120 that protrudes from an upper surface of inner terminal cartridge 102, and engages with a slot 220 defined in the insulator body 202 when inner terminal cartridge 102 is inserted far enough into insulator body 202 to reach the staged position. As shown in the FIG. 3 example, the slot 220 may be defined by the end of a cantilevered protrusion 221 that extends from the insulator body 202 and deflects to allow the ramped feature 120 to reach the slot 220.

In some optional embodiments, for example as shown in FIG. 1 connector 100 may also, or instead, include crush rails that operate to retain inner terminal cartridge 102 within the insulator body 202 to provide maximum forward installation of the inner terminal cartridge 102 without lock overtravel for reduced tolerance stack-up and maintained signal integrity. For example, as shown in FIG. 2, connector 100 may include crush rails 208 defined in the insulator body 206. In other examples, inner terminal cartridge 102 may instead include crush surfaces 115 defined in the slots 114 in the inner terminal cartridge 102, as shown in FIGS. 3-5 and 12. These crush rails 208, 115 may, in some examples, provide sufficient retention of inner terminal cartridge 102 throughout the electrical connector assembly process.

In some examples, as illustrated by comparison of FIGS. 3 and 4, which show respective top and bottom views of connector 100 components, inner terminal cartridge 102 and insulator body 202 may be substantially symmetrical about a lateral axis in the insertion direction 207 depicted in FIG. 2, meaning that both sides of inner terminal cartridge 102 include symmetrical features that interact with corresponding symmetrical features of insulator body 202. For example, as shown in FIG. 3, a top side of inner terminal cartridge 102 includes a first ramp feature 120 that interacts with a corresponding first slot 220 in the insulator body 202 that is defined by a first cantilevered protrusion 221 to secure inner terminal cartridge 102 staged in insulator body 202. As shown in FIG. 4, a bottom side of inner terminal cartridge 102 includes a second ramp feature 120' that interacts with a corresponding second slot 220' in the insulator body 202 that is defined by a second cantilevered protrusion 221' to secure inner terminal cartridge 102 seated in insulator body 202. Alignment features, including for example rails 204 and corresponding slots 114', which optionally include crush rails 115', may also be symmetrically arranged, on the insulator body 202 and the inner terminal cartridge 102, respectively.

Connector 100, which includes inner terminal cartridge 102, eliminates the risk of misalignment if the individual inner terminals 108 during plugging by capturing each inner terminal in a terminal cavity 110 for proper retention and positioning of the inner terminals 108A, 108B throughout the electrical connector assembly process. The inner terminal cartridge 102 provides easier alignment of the inner terminals 108 during the electrical connector assembly process due to the advantage handling the inner terminal cartridge 102 with the pair of inner terminals 108A, 108B pre-aligned with each other rather than two separate free floating inner terminals as was done previously. The terminal cavities 110, which in some examples are "C" shaped, allow for side, top, bottom, or axial loaded terminal installation. In some examples, side loading of the inner terminals 108A, 108B into the inner terminal cartridge 102 reduces terminal overtravel and lock deflection compared to linear axial plugging of the inner terminals 108A, 108B into a conventional terminal insulator, resulting in a reduced stop-to-lock tolerance stack-up and improved signal integrity throughout tolerance range. The inner terminal cartridge 102 also maintains terminal-to-terminal centerline positioning of the inner terminals 108A, 108B to one another during the electrical connector assembly process. In other embodiments not depicted, the inner terminal cartridge 102 may be configured for top, bottom, or axial loading of the terminated leads 104A, 104B into the inner terminal cartridge 102.

Figure 13:
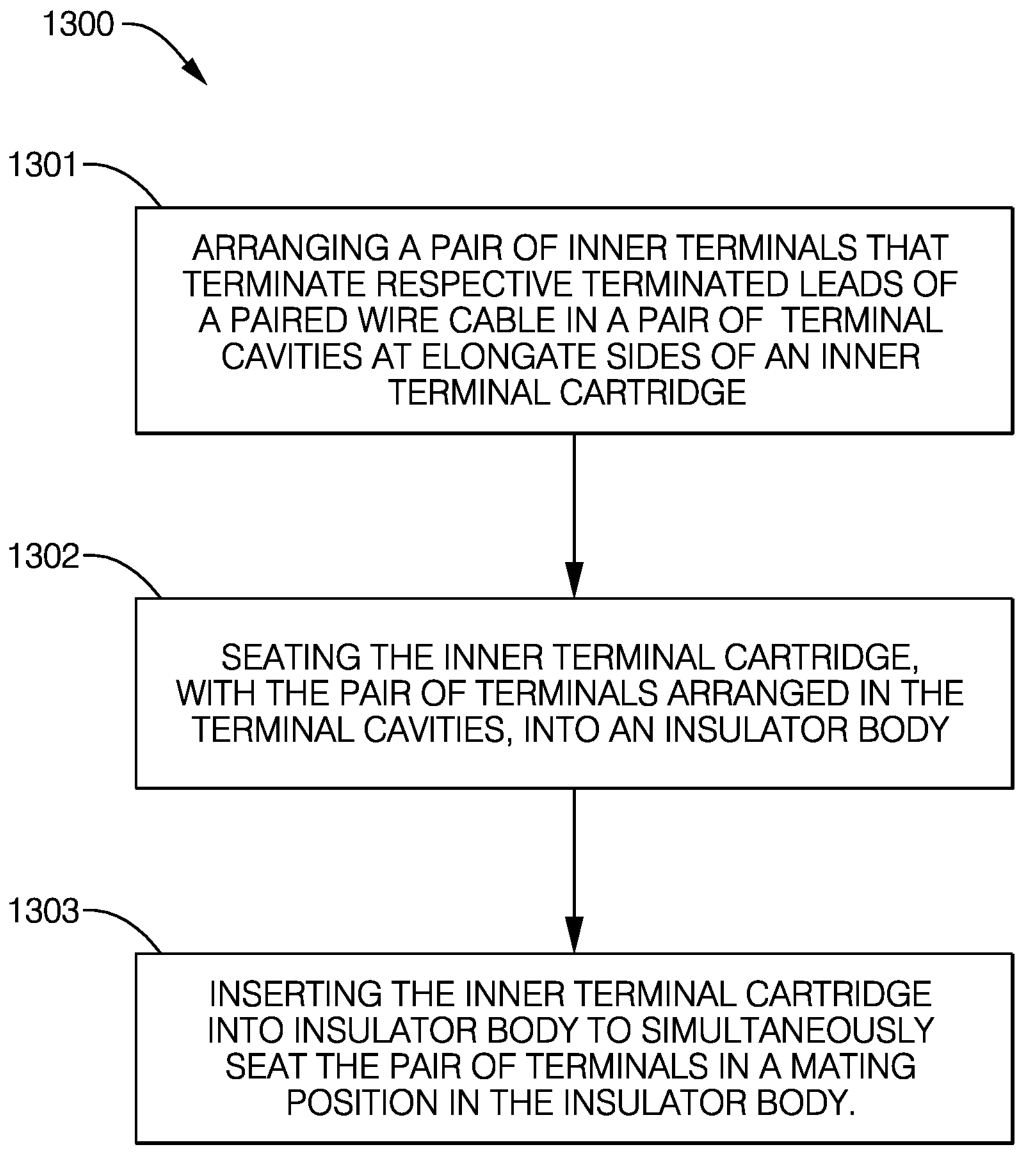
FIG. 13 illustrates a flow diagram depicting a method of assembling an electrical connector according to some embodiments.

FIG. 13 is a flow diagram depicting one example of a method 1300 of assembling an electrical connector for a paired wire cables according to some embodiments. As shown in FIG. 13, at step 1301, the method includes arranging a pair of inner terminals 108A, 108B that terminate respective terminated leads 104A, 104B, in a pair of terminal cavities 110 at elongate sides of an inner terminal cartridge 102. In some examples, arranging the pair of inner terminals includes side loading the pair of inner terminals in the pair of terminal cavities. In some examples, the inner terminals include at least one protrusion 113, 113A-113B that engages with the pair of terminal cavities to laterally align the inner terminals relative to the inner terminal cartridge.

As also shown in FIG. 13, at step 1302, the method further includes seating the inner terminal cartridge, with the pair of inner terminals arranged in the pair of terminal cavities, in an insulator body 202. At step 1302, the method further includes inserting the inner terminal cartridge into the insulator body to simultaneously stage the pair of inner terminals in a mating position in the insulator body. In some examples, the method includes inserting the inner terminal cartridge into the insulator body until the inner terminal cartridge is staged in the insulator body, which simultaneously stages the pair of inner terminals in the mating position in the insulator body.

In some examples, the method includes inserting the inner terminal cartridge while aligned by alignment features of the inner terminal cartridge (e.g., slots 114) that interact with corresponding alignment features of the insulator body (e.g., rails 204), either of which may optionally include crush surfaces 115,208. In some examples, the method includes inserting the inner terminal cartridge until one or more lock features engage to secure the inner terminal cartridge staged in the insulator body. For examples, the inner terminal cartridge may include a ramp feature 120 that interacts with a corresponding slot 220 in the insulator body, which may be defined by a cantilevered protrusion 221 that deflects to allow the ramp feature to travel to the slot 220. In some examples, inserting the inner terminal cartridge into the insulator body further includes inserting the inner terminal cartridge until an indicator peg 112 on the inner terminal cartridge is visible through an indicator slot 232 in the insulator body.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector, comprising:

an insulator body; and an inner terminal cartridge with a pair of C-shaped terminal cavities that retain a pair of inner terminals of the paired wire cable at elongate sides of the inner terminal cartridge, wherein the terminal cavities are configured to be side-loaded by accepting the terminals along an insertion axis perpendicular to mating axes of the pair of inner terminals and wherein the inner terminal cartridge is configured to be seated in the insulator body with the pair of inner terminals retained in the pair of terminal cavities and inserted into the insulator body to simultaneously stage the pair of inner terminals in a mating position in lateral alignment in the insulator body.

2. The electrical connector of claim 1, wherein the inner terminal cartridge is configured to be inserted into the insulator body until the inner terminal cartridge reaches a staged position in the insulator body, which simultaneously stages the pair of inner terminals in the mating position in lateral alignment in the insulator body.

3. The electrical connector of claim 1, wherein the pair of inner terminals each include protrusions that engage with the pair of terminal cavities to retain and define the position of the pair of inner terminals in a lateral position relative to the inner terminal cartridge.

4. The electrical connector of claim 1, further comprising:

at least one lock feature that engages in response to the inner terminal cartridge being inserted into the insulator body and secures the inner terminal cartridge in the insulator body.

5. The electrical connector of claim 4, wherein the at least one lock feature comprises:

a ramp structure on the inner terminal cartridge that snaps into a slot defined in the insulator body.

6. The electrical connector of claim 5, wherein the slot is defined by a cantilevered protrusion that deflects in response to the ramp structure and allows the inner terminal cartridge to be inserted into the insulator body until the ramp structure reaches the slot.

7. The electrical connector of claim 1, further comprising:

an insulative spacer feature integral to the inner terminal cartridge that insulates the pair of inner terminals from one another.

8. The electrical connector of claim 1, wherein the inner terminal cartridge further includes an indicator peg configured to extend through an indicator slot in the insulator body, wherein the indicator peg serves as a visible indication to an operator whether the inner terminal cartridge is staged in the insulator body.

9. The electrical connector of claim 1, further comprising:

one or more alignment features on the inner terminal cartridge that engage with corresponding alignment features of the insulator body to define a path of the inner terminal cartridge in the insulator body.

10. An electrical connector assembly, comprising:

a pair of terminated leads carried within an external jacket and terminated by a pair of inner terminals; and the electrical connector of claim 1.

11. The electrical connector of claim 1, further comprising one or more crush rails that collapse in response to the inner terminal cartridge being inserted into the insulator body and retain the inner terminal cartridge in the insulator body.

12. An electrical connector, comprising:

an insulator body;

an inner terminal cartridge with a pair of terminal cavities that retain a pair of inner terminals of the paired wire cable at elongate sides of the inner terminal cartridge, wherein the inner terminal cartridge is configured to be seated in the insulator body with the pair of inner terminals retained in the pair of terminal cavities and inserted into the insulator body to simultaneously stage the pair of inner terminals in a mating position in lateral alignment in the insulator body; and one or more crush rails that collapse in response to the inner terminal cartridge being inserted into the insulator body and retain the inner terminal cartridge in the insulator body.

13. A method, comprising:

arranging a pair of inner terminals that terminate respective terminated leads of a paired wire cable in a pair of C-shaped terminal cavities at elongate sides of an inner terminal cartridge by side-loading the pair of inner terminals into the pair of terminal cavities along an insertion axis perpendicular to mating axes of the pair of inner terminals;

seating the inner terminal cartridge, with the pair of inner terminals arranged in the pair of terminal cavities, into an insulator body; and inserting the inner terminal cartridge into the insulator body to simultaneously stage the pair of inner terminals in a mating position in the insulator body.

14. The method of claim 13, further comprising:

inserting the inner terminal cartridge until the inner terminal cartridge reaches a staged position in the insulator body, which simultaneously stages the pair of inner terminals in the mating position in the insulator body.

15. The method of claim 13, further comprising:

using at least one protrusion on the pair of inner terminals to define a lateral position of the pair of inner terminals relative to the inner terminal cartridge.

16. The method of claim 13, wherein inserting the inner terminal cartridge into the insulator body to simultaneously stage the pair of inner terminals in a mating position in the insulator body comprises engaging a lock feature that secures the inner terminal cartridge in the insulator body.

17. The method of claim 13, wherein the lock feature comprises:

a ramp structure on the inner terminal cartridge that snaps into a slot defined in the insulator body, wherein inserting the inner terminal cartridge into the insulator body to simultaneously stage the pair of inner terminals in the mating position includes inserting the inner terminal cartridge until the ramp structure engages with the slot.

* * * * *